United States Patent [19]
Moreton et al.

[11] Patent Number: 5,835,729
[45] Date of Patent: Nov. 10, 1998

[54] CIRCUIT TO SEPARATE AND COMBINE COLOR SPACE COMPONENT DATA OF A VIDEO IMAGE

[75] Inventors: Henry P. Moreton, Oakland; Michael L. Fuccio, Sunnyvale; Mark W. Troeller, Visalia; Charles F. Tuffli, III, Cupertino; David K. Barnett, Santa Clara, all of Calif.

[73] Assignee: Silicon Graphics, Inc., Mountain View, Calif.

[21] Appl. No.: 713,600

[22] Filed: Sep. 13, 1996

[51] Int. Cl.$^6$ ....................................................... G06F 17/00
[52] U.S. Cl. ........................................ 395/200.76; 348/664
[58] Field of Search ..................... 395/200.76, 200.68; 364/715.02, 715.11, 724.13; 348/663, 664, 665

[56] References Cited

U.S. PATENT DOCUMENTS

| | | | |
|---|---|---|---|
| 4,489,346 | 12/1984 | Tanaka et al. | 348/664 |
| 5,426,469 | 6/1995 | Kojima | 348/664 |
| 5,633,689 | 5/1997 | Willis et al. | 348/665 |

OTHER PUBLICATIONS

Tom et al.; "Packet Video for Cell Loss Protection Using Deinterleaving and Scrambling"; ICASP 1991: Acoustics, Speech & Signal Processing Conference, 1991.

*Primary Examiner*—Ellis B. Ramirez
*Attorney, Agent, or Firm*—Wagner, Murabito & Hao

[57] ABSTRACT

A method and arrangement for separating interleaved luminance and chrominance color space components data in a single data stream with minimum CPU intervention is provided. In the separating circuit, the separating circuit receives as input a series of graphics/video image data composed of interleaved luminance and chrominance color space components at successive clock cycles. The separating circuit directs selected bytes of the graphics/video image data representing the luminance color space component to a first path wherein luminance component data received at two successive clock cycles are combined. Likewise, selected bytes of the graphics/video image data representing the chrominance color space component are directed to a second path wherein chrominance component data received at two successive clock cycles are combined. Then, the combined luminance and chrominance component data are output alternately. Conversely, a method and arrangement for interleaving luminance and chrominance color space components data in stored separately into a single data stream is also provided.

17 Claims, 7 Drawing Sheets

FIG. 5A DIN(63:00) 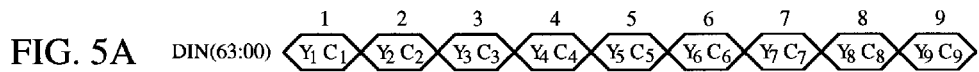
FIG. 5B CLK 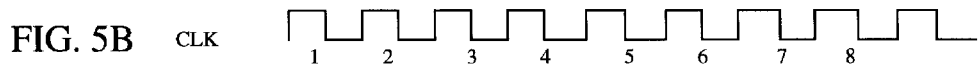
FIG. 5C LD_31_00 
FIG. 5D LD_63_32 
FIG. 5E LDD_63_32 
FIG. 5F SEL_CHROMA 
FIG. 5G YOUT_D (31:00) 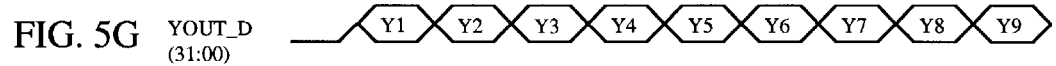
FIG. 5H COUT_D (31:00) 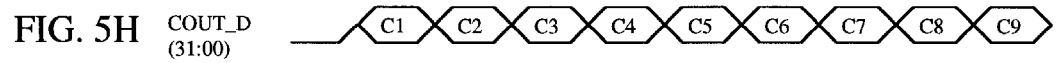
FIG. 5I COUT_DU (31:00) 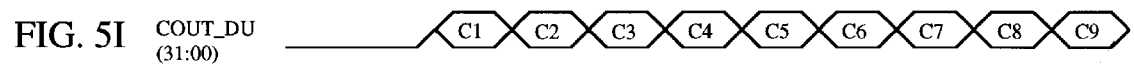
FIG. 5J YOUT_DD (63:00) 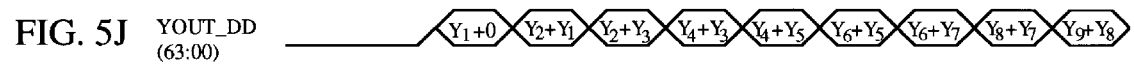
FIG. 5K COUT_DD (63:00) 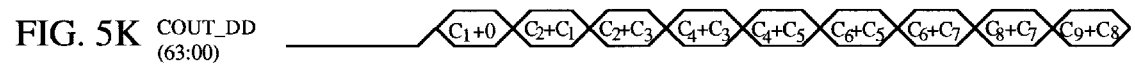
FIG. 5L DOUT (63:00) 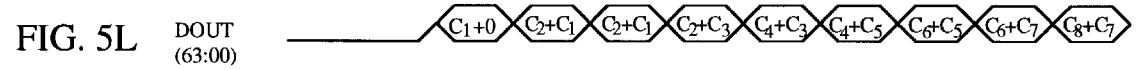

DI(63:00)

CLK

LD_Y

LD_C

SEL(2:0)

Y_D(63:00)

C_D(63:00)

YC_D(63:00)

CIRCUIT TO SEPARATE AND COMBINE COLOR SPACE COMPONENT DATA OF A VIDEO IMAGE

BACKGROUND OF THE INVENTION

FIELD OF THE INVENTION

The invention generally relates to computer data transfer, and more particularly relates to a direct memory access transfer.

PRIOR ART

In direct memory access (DMA) transfers, a special control circuit is provided to enable transfer of a large block of data directly between the device and the main memory without incurring excessive overhead by the CPU. The CPU still sets up the transfer by sending initialization information namely the starting address in memory, the data, and the number of words to be transferred to the DMA engine. However, subsequent to this, the DMA engine controls the actual data transfer.

Graphic and video image processing in computer systems often involves heavy data transfer. A graphic or video image is made up of large blocks of pixels. After graphic and video images enter a computer system through video ports, network ports, and mass storage devices such as CD-ROMS, they are stored in a system memory. Graphic and video images are then transferred to a designated location, usually a local memory inside the graphics/video controller, where image processing is performed. After processing, however, graphics and video image data are transferred back to system/main memory for storage. Because DMA transfer can handle large transfer of data, DMA transfer is the logical method to utilize in moving graphic and video images in computer systems.

Each pixel in full color graphic and video images may comprise a luminance (luma) component and a chrominance (chroma) component. The luma component defines the brightness of the color and may be referred to as the "Y" component. The chroma component is normally further divided into two sub-components which define the hue and saturation of the color. The two chroma sub-components may be referred to as the "Cr" and "Cb" components. The three color components described above make up a luminance-chrominance color space. Another type of color space is an RGB (red-green-blue) space. In the RGB color space, each color pixel comprises a red component, green component, and a blue component which are the basic components of any color.

Regardless of the type of color space involved, when color graphic or video images enter the computer system and are stored in the main memory, the color components are stored in an interleaved format. Consider, for example, a color graphic or video image in luminance-chrominance color space. The color graphic or video image is broken into Y, Cr, and Cb bytes and may be stored in the main memory in streams having the following format: Cr Y Cb Y. Most processing algorithms, however, are written to handle separate data streams of Y component or separate data streams of Cr together with Cb components. As such, before the graphics processor can process the video image data, the data must be first separated into streams of Y and Cr/Cb components. In the prior art, the host CPU normally handles this separating task which requires two cycle operations of masking and shifting to separate a data byte. This is inefficient use of the host CPU especially when a long stream of data is involved. The same challenge is also presented to color graphic or video images in other color spaces such as RGB.

Conversely, when processed graphic or video image data is transferred back to the main memory for storage, separate streams of Y component and Cr together with Cb components need to be converted back to one data stream of interleaved Y, Cr, and Cb components. Using the host CPU to handle this combining task as in the prior art is also making inefficient use of a scarce resource. Again, the same challenge is also presented to color graphic or video images in other color spaces such as RGB.

Thus, a need exists for an arrangement to separate interleaved color space components data with minimum intervention by the host CPU. Also, a need exists for an arrangement to combine separate color space components data into an interleaved format with minimum intervention by the host CPU.

SUMMARY OF THE INVENTION

Accordingly, the present invention provides an arrangement to efficiently separate the interleaved color space components in one data stream with minimum CPU intervention.

The present invention further provides an arrangement to efficiently interleave separate color space components data with minimum CPU intervention.

The present invention meets the above need with an arrangement to separate M interleaved data types in one data stream. The arrangement comprises: a routing circuit, M combining circuits, and a selecting circuit. The routing circuit receives as input N data bits of the data stream at a time. The N data bits contains all M data types. The routing circuit directs the data bits of each data type to a predetermined one of M routing data signals. Each of M combining circuits is coupled to one of the M routing data signals. To form a combined data signal having N data bits, the M combining circuits adjoins data bits received over M successive clock cycles in a predetermined order. The selecting circuit receives the M combined data signals. The selecting circuit outputs the M combined data signals received in a predetermined order.

The present invention further meets the above need with an arrangement for interleaving data bits of X different data types into a stream of data bits. The arrangement comprises X latching circuits, a routing circuit, and Y/Z selecting circuits. Each of the X latching circuits receives as input Y data bits of a predetermined data type at every X clock cycles. Each of the X latching circuits outputs the Y data bits received at every X clock cycles repeatedly for a predetermined number of successive clock cycles. The routing circuit receives as input the outputs from the X latching circuits. The routing circuit directs a signal having X*Z selected data bits of a data type to a predetermined one of Y/Z routing data signals. Each of the Y/Z selecting circuits receives a predetermined one of the Y/Z routing data signals. Each of the Y/Z selecting circuits selectively outputs Z data bits of a data type at a time. The effect is that the Y/Z selecting circuits provides a combined output signal having Y data bits of X data types which are interleaved in a predetermined order.

All the features and advantages of the present invention will become apparent from the following detailed description of its preferred embodiment whose description should be taken in conjunction with the accompanying drawings.

BRIEF DESCRIPTION OF THE DRAWINGS

FIGS. 5A–5L are timing diagrams of certain inputs, outputs, and nodes of the separating circuit of FIG. 4.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Figure 1:
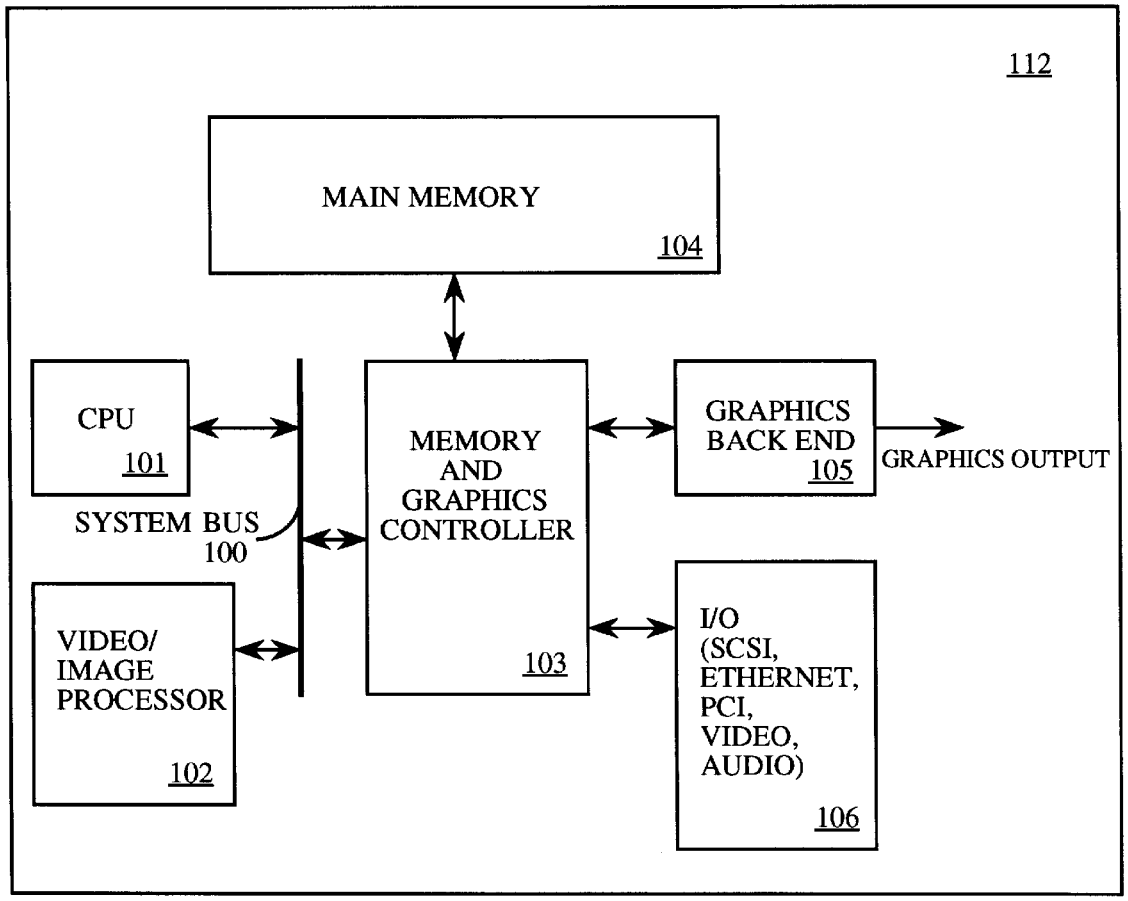
FIG. 1 is a system level block diagram illustrating a computer system.

Refererence is now made to FIG. 1 which illustrates a computer system 112. In general, computer system 112 used by the preferred embodiment of the present invention comprises bus 100 for communicating information; central processor 101 coupled with bus 100 for processing information and instructions; video/image processor 102 coupled to bus 100 for performing image processing, compression, and expansion; memory and graphics controller 103 coupled between bus 100 and main memory 104 for graphics processing (e.g., rendering, blending, z-buffer checks, pixel logical ops, frame buffer management) and controlling data transfer to and from main memory 104; I/O connections 106 (e.g., SCSI ports, ethernet ports, video ports, and audio ports) coupled to memory and graphics controller 103; and graphics back end processor 105 for formatting graphics/video output.

Figure 2:
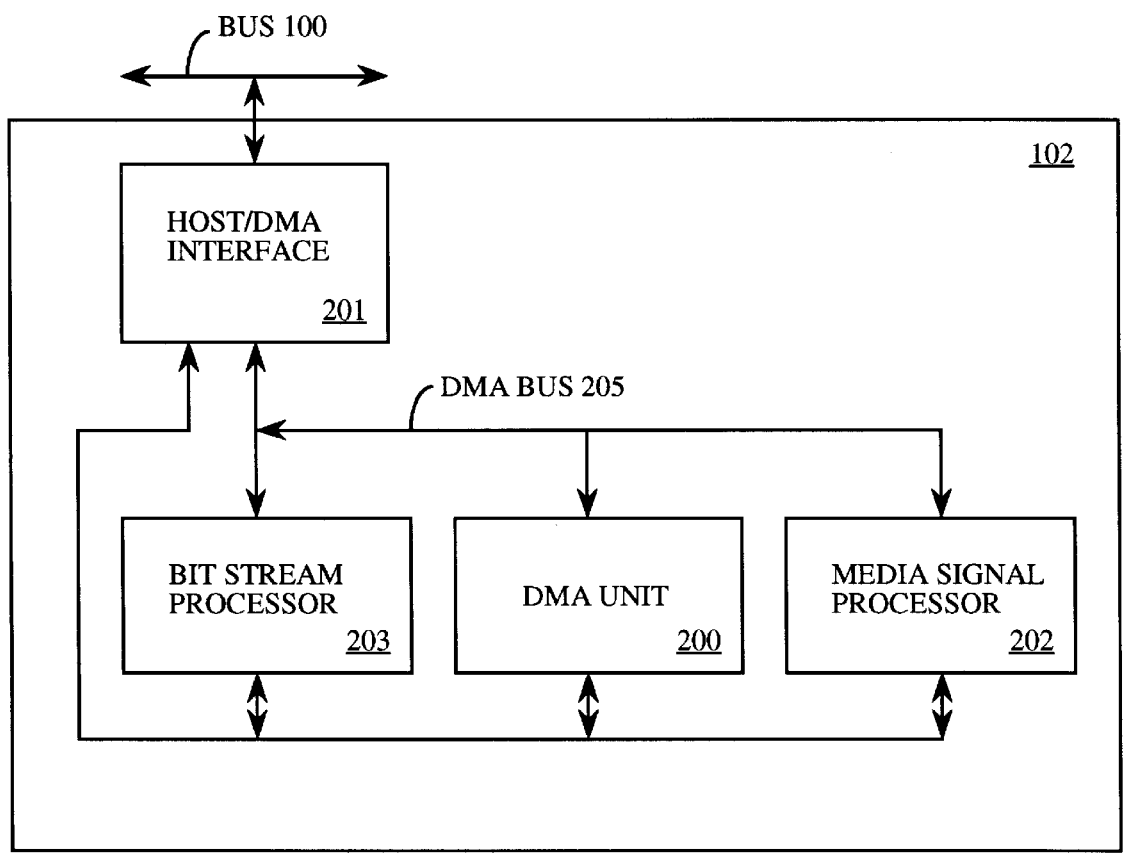
FIG. 2 is a block diagram illustrating the graphics/video processing unit shown in FIG. 1.
Figure 3:
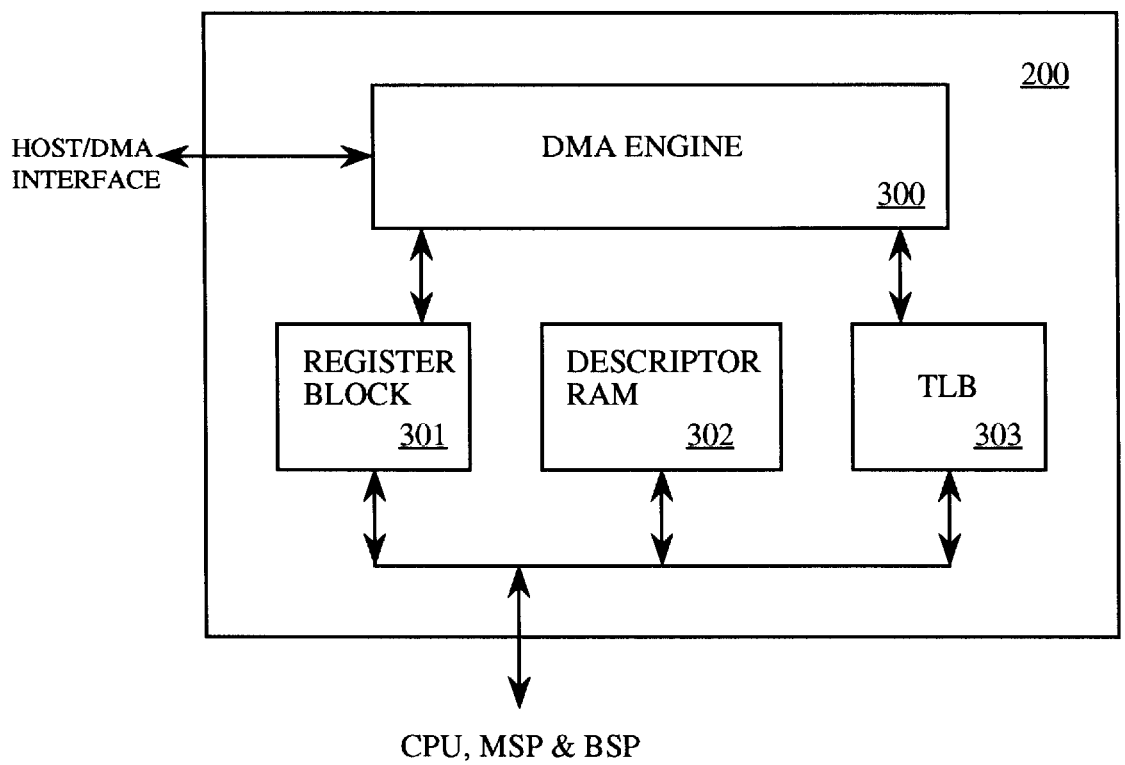
FIG. 3 is a block diagram illustrating the DMA unit which is a part of the video/graphics processor shown in FIG. 2.

Video/image processor 102 is illustrated in more details in FIG. 2. Briefly, video/image processor 102 comprises host/DMA interface 201, DMA unit 200, media signal processor (MSP) 202, and bit stream processor (BSP) 203. Host/DMA interface 201 provides the interface between video/image processor 102 and bus 100. Because video/image processor 102 shares bus 100 with central processor 101 and memory and graphics controller 103, host/DMA interface 201 also communicates with central processor 101 and memory and graphics controller 103 to arbitrate for the right to use bus 100 at any one time. Only upon gaining control of bus 100 can video/image processor 102 initiate transactions on bus 100.

There are two internal buses that connect DMA unit 200, BSP 203, and MSP 202 to each other to allow these units access to any memory resource residing in any of the units. DMA bus 205 also connects host/DMA interface 201, BSP 203, and DMA unit 200 to the data memory banks inside MSP 202. Common bus 206 connects host/DMA interface 201, BSP 203, DMA unit 200, and MSP 202 together to allow these units access to memory resources including registers inside video/image processor 102 other than the data memory banks and instruction memory banks inside MSP 202. In having these internal buses, two clients are allowed access to the data memory banks simultaneously provided that the requested banks are different. In addition, having these internal buses allows access by any client to common bus 206 while allowing transactions to occur on other buses.

MSP 202 is used to perform graphics/video image data processing. In addition to two digital signal processors, MSP 202 has data memory banks (a.k.a local memory) for the storing graphics/video image data received from main memory 104 and for storing the firmware program operands. MSP 202 also has program memory banks for storing the firmware programs to process the graphics/video image data stored in the data memory banks. By having the digital signal processors, the program memory banks, and the data memory banks on the same chip, the access time and consequently processing time required is minimized.

BSP 203 is used to perform data compression and decompression. BSP 203 has a local processor, an instruction memory, and a table memory. The instruction memory stores the instruction codes to perform arithmetic operations, jump and branches operations, data transfer between memory and register operations, and manipulation of bit stream data. The instruction memory also stores instruction codes to perform table look up operations to decode bit stream data. The table memory stores decompression and compression algorithms used in look up operations. The architecture of BSP 203 allows real-time compression and decompression of high bit rates in low-compression JPEG and MPEG-2 standards.

DMA unit 200 performs DMA transfers between main memory 104 (via memory and graphics controller 103) and memory resources (e.g., local memory) inside video/image processor 102. DMA unit 200 has two DMA channels. DMA unit 200 comprises DMA engine 300, register block 301, descriptor RAM 302, and translation buffer (TLB) 303. Descriptor RAM 302 stores descriptor requests programmed by either central processor 101, MSP 202, or BSP 203 to initiate a DMA transfer. Descriptor requests are used to define starting addresses, DMA modes (i.e., read, write, color space components splitting and interleaving, etc.), width setting (i.e., number of data words for transferring per line), and stride setting (i.e., number of words to skip per line). A descriptor can be used to halt the DMA engine. Register block 301 houses control registers which are programmed by central processor 101, MSP 202, or BSP 203 to initiate DMA transfer. The control registers inside register block 301 provide the information DMA engine 300 needed for controlling a DMA transaction (e.g., the current address, DMA ON/OFF switch, word count, etc) as well as status information for feedback purpose. In other words, the control registers further define the character of the DMA transfer. TLB 303 is a look-up table used to map an address space to main memory 104. The contents of the addresses of TLB 303 are used to form part of the complete main memory address space Descriptor request from descriptor RAM 302 along with the contents of the control registers in register block 301 are passed on to DMA engine 300 which performs the DMA transfer. DMA engine 300 also houses the arrangement to carry out aspects of the present invention as will be described below.

Figure 4:
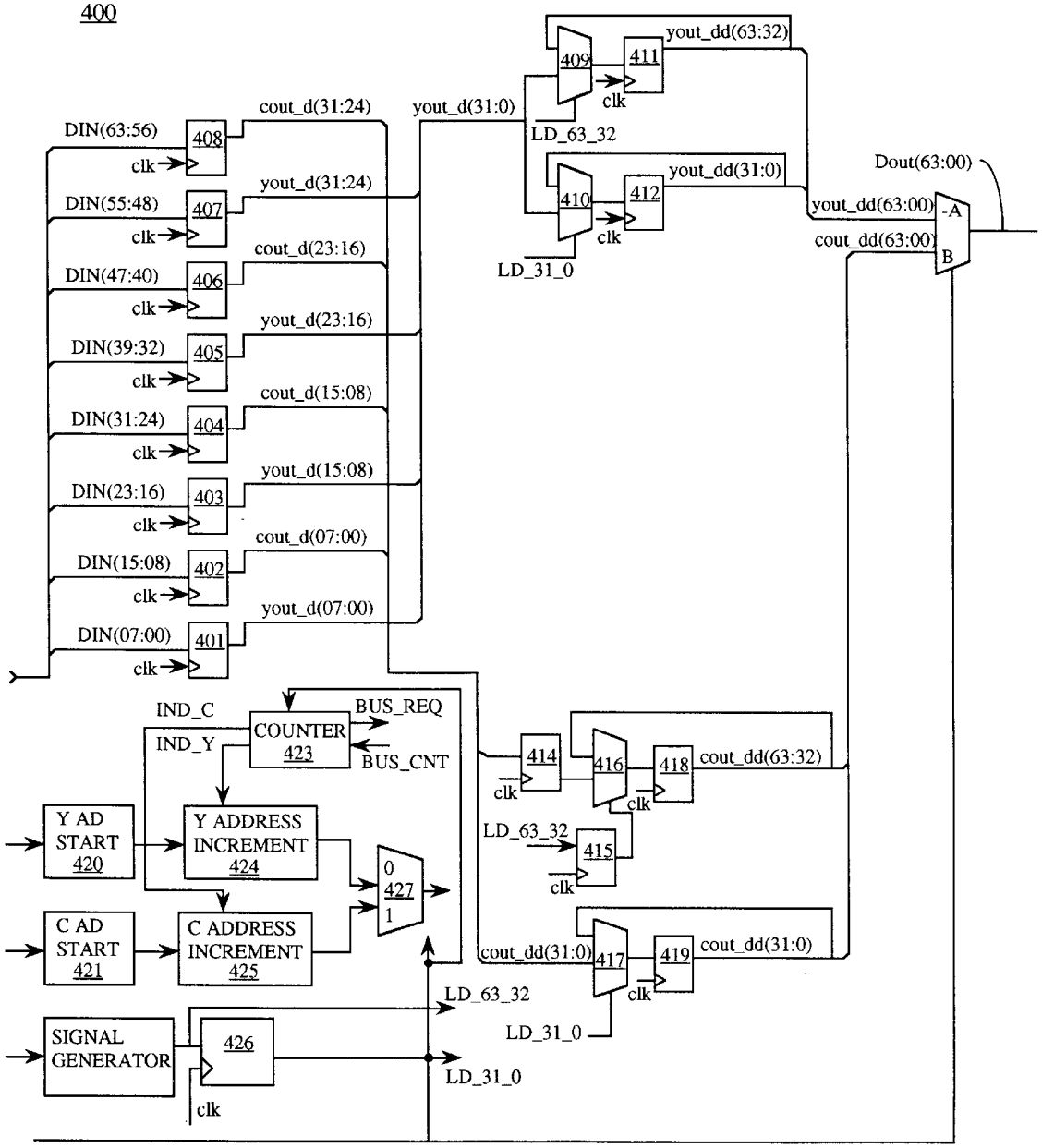
FIG. 4 is a block diagram illustrating an embodiment of the circuit to separate the interleaved color space components in a data stream in accordance with the present invention.

Referring now to FIG. 4 illustrating a circuit to retrieve data stored in an interleaved format and split into separate blocks of color space components data in accordance with the preferred embodiment of the present invention. The circuit in FIG. 4 is designed for luminance-chrominance color space. However, it is clear to a person of ordinary skill in the art that with minor modifications the circuit in FIG. 4 is applicable to other color spaces such as the RGB color space.

In FIG. 4, data from main memory 101 is sent over bus 100 to circuit 400. Because bus 100 is a sixty-four (64) bit-wide bus, eight (8) bytes of data are sent to circuit 400 as data signal DIN(63:00) at any one time. The eight bytes of data (i.e., DIN(07:00), DIN(15:08), DIN(23:16), DIN(31:24), DIN(39:32), DIN(47:40), DIN(55:48), and DIN(63:56)) are arranged in the following order: YCrYCbYCrYCb, wherein each letter represents a data byte. In this order, a byte of luminance component is followed by a byte of red-chrominance component which is followed by another byte of luminance component which is then followed by a byte of blue-chrominance component and so on. As such, byte DIN(07:00) always corresponds to a byte of luminance component Y, byte DIN(15:08) always corresponds to a byte of red-chrominance component Cr, byte DIN(23:16) always corresponds to a byte of luminance component Y, byte DIN(31:24) always corresponds to a byte of blue-chrominance component Cb, byte DIN(39:32) always corresponds to a byte of luminance component Y, byte DIN(47:40) always corresponds to a byte of red-chrominance component Cr, byte DIN(55:48) always corresponds to a byte of luminance component Y, and byte DIN(63:56) always corresponds to a byte of blue-chrominance component Cb.

The eight bytes of data signal DIN(63:00) are provided as inputs to D flip flops 401–408 respectively. Because the content character of each byte of data signal DIN(63:00) is known in advance, the luminance color space component can be separated from the chrominance color space component by providing the bytes of data signal DIN(63:00) carrying luminance color space data to designated registers 401, 403, 405, and 407 as well as providing the bytes of data signal DIN(63:00) carrying chrominance color space data to designated registers 402, 404, 406, and 408. System clock signal CLK is provided as an input to registers 401–408 for synchronization purpose. Registers 401–408 function similarly to D-type flip-flops ensure that the value of the current data signal DIN(63:00) is held constant for one clock cycle in order to separate the interleaved luminance and chrominance component data of DIN(63:00) input signals into separate streams.

From the outputs of registers 401–408, the luminance component Y data and the chrominance component C data of signal DIN(63:00) are separated into signals YOUT_D(31:00) and COUT_D(31:00) respectively. Because bus 100 is 64 bit-wide, to be efficient, two successive YOUT_D(31:00) signals are combined first before they are output to bus 100. Similarly, two successive COUT_D(31:00) signals are combined first before they are output to bus 100. The combination of multiplexer 409 and register 411 together with the combination of multiplexer 410 and register 412 are used to combine successive YOUT_D(31:00) signals into YOUT_D(63:00). Registers 411 and 412 function similarly to D-type flip-flops to hold their outputs constant for one clock cycle.

Signal YOUT_D(31:00) from the outputs of registers 401, 403, 405, and 407 is provided as input to two-to-one multiplexers 409 and 410. The other inputs to multiplexers 409 and 410 are the outputs of registers 411 and 412 respectively. Multiplexers 409 and 410 are controlled by select signals LD_31_0 and LD_63_32 respectively. Select signal LD_31_0 is the inverse of select signal LD_63_32 and vice versa.

In the preferred embodiment, when signal LD(31:00) is high, signal YOUT_D(31:00) is allowed to pass through multiplexer 410. Otherwise, when signal LD_31_0 is low, the output of register 412, signal YOUT_DD(31:00), is allowed to pass through as a repeat. Similarly, when signal LD_63_32 is high, signal YOUT_D(31:00) is allowed to pass through multiplexer 409. Otherwise, when signal LD_63_32 is low, the output of register 411, signal YOUT_DD(63:32) is allowed to pass through as a repeat. Because select signals LD_31_0 and LD_63_32 are inverted relative to each other and by controlling their relative pulse sequences, successive YOUT_D(31:00) signals representing the luminance component data of successive DIN(63:00) data signals are output to registers 411 and 412 in the desired sequences for processing.

The outputs of multiplexers 409 and 410 are provided as inputs to registers 411 and 412 respectively which hold the values of the outputs of multiplexers 409 and 410 constant for one clock cycle to allow two successive YOUT_D(31:00) data signal to be combined synchronously into as single YOUT_DD(63:00) data signal. System clock signal CLK is provided as an input to registers 411 and 412 for synchronization purpose. In addition to being feedback inputs to multiplexers 409 and 410 respectively, output signals YOUT_DD(63:32) and YOUT_DD(31:00) are combined into signal YOUT_DD(63:00) and provided as a first input to multiplexer 413. In having the output signals of registers 411 and 412 fed back to multiplexers 409 and 410 respectively, a repeat occurrence of the same YOUT_D(31:00) data signal necessary for combining successive YOUT_D(31:00) data signals is provided.

Successive signals COUT_D(31:00) are combined into signal COUT_DD(63:00) in a similar fashion. However, extra hardware is needed to insert a wait state into signal COUT_D(31:00) to compensate for the extra delay signal COUT_DD(63:32) must endure because of the output order of multiplexer 413. Signal COUT_D(31:00) from the outputs of registers 402, 404, 406, and 408 is provided as input to register 414. Clock signal CLK is also provided as an input to register 414. Register 414 functions like a D-type flip-flop to provide the extra time delay of one clock cycle required. Register 414 provides signal COUT_DU(31:00) as an input to multiplexer 416. The other input to multiplexer 416 is signal COUT_DD(63:32) which is the output of register 418. Since select signal LD_63_32 needs to be synchronized with signal COUT_DU(31:00), select signal LD_63_32 is supplied as an input to register 415 which in turns inserts a wait state of one clock cycle into select signal LD_63_32 and outputs the delayed signal as select signal LDD_63_32 to multiplexer 416.

On the other hand, extra delay is not required for signal COUNT_DD(31:00). Signal COUT_D(31:00) from the outputs of registers 402, 404, 406, and 408 is provided as input to multiplexer 417. The other input to multiplexer 417 is signal COUT_DD(31:0) which is the output of register 419. Select signal LD_31_00 is provided as a control signal to multiplexer 417. With the wait state of one clock cycle, the delayed select signal LDD_63_32 is substantially similar to select signal LD_31_00.

In the preferred embodiment, when signal LD(31:00) is high, signal COUT_D(31:00) is allowed to pass through multiplexer 417. Otherwise, when signal LD(31:00) is low, the output of register 419, signal COUT_DD(31:00), is allowed to pass through as a repeat. Similarly, when the delayed signal LD(63:32) is high, signal COUT_D(31:00) is allowed to pass through multiplexer 416. Otherwise, when the delayed signal LD(63:32) is low, the output of register 418, signal COUT_DD(63:32) is allowed to pass through as a repeat. The wait state inserted into signal COUT_DU (31:0) and select signal LD_63_32 allows successive COUT_D(31:00) signals representing the luminance component data of successive DIN(63:00) data signals to be supplied to registers 418 and 419 in the desired sequences for processing.

The outputs of multiplexers 416 and 417 are provided as inputs to registers 418 and 419 respectively which hold the values of the outputs of multiplexers 416 and 417 constant for one clock cycle to allow two successive COUT_D (31:00) data signal to be combined synchronously into as single COUT_DD(63:00) data signal. System clock signal CLK is provided as an input to registers 418 and 419 for synchronization purpose. In addition to being feedback inputs to multiplexers 416 and 417 respectively, output signals COUT_DD(63:32) and COUT_DD(31:00) are combined into signal COUT_DD(63:00) and provided as a second input to multiplexer 413. In having the output signals of registers 418 and 419 fed back to multiplexers 416 and 417 respectively, a repeat occurrence of the same COUT_D(31:00) data signal necessary for combining successive COUT_D(31:00) data signals is provided.

Select signal sel_chroma controls the output of multiplexer 413. In the preferred embodiment, when signal sel_chroma is high, signal COUT_DD(63:0) is passed through as data signal DOUT(63:00). Otherwise, when signal sel_chroma is low, signal YOUT_DD(63:00) is passed through as data signal DOUT(63:00). Data signal DOUT(63:00) is sent to the internal memory of MSP 202 for processing.

As discussed above, the three control signals LD_31_0, LD_63_32, and sel_chroma play important roles in separating the interleaved luminance and chrominance data components. To generate the three control signals for the current invention, central processor 101 provides a signal indicating the start of a DMA transfer to signal generator 422 (e.g., the first DIN(63:00) data signal). Signal generator 422 provides as its output a series of pulses. This series of pulses is select signal LD_63_32. Preferably, each pulse width is equal to one clock signal CLK cycle. Moreover, select signal LD_63_32 preferably has a high value in its idle state and has a delay of approximately two clock cycles relative to the first DIN(63:00) data signal. Select signal LD_63_32 is provided as an input into D flip-flop 426 which has a delay of approximately one clock signal CLK cycle. D flip flop 426 provides as its output select signal LD_31_0. In the preferred embodiment, select signal sel_chroma is the same as select signal LD_31_0. The three select signals and their preferred embodiments are further discussed in the timing diagram illustrated in FIG. 5.

For a DMA transfer, the starting memory address of the destination memory must be provided along with the data. As such, a corresponding memory address must accompany a signal DOUT(63:00) every time. To generate the corresponding memory address for each DOUT(63:00) signal which carries either sixty-four (64) bits of luminance or chrominance component data, at the start of the DMA transfer, central processor 101 first load the starting chrominance address and the starting luminance address into registers 421 and 420 respectively. These starting addresses stored in registers 420 and 421 are then provided to Y address increment counter 424 and C address increment counter 425 respectively to use in updating the addresses required in DMA transfer.

Counter 423 monitors the number of bytes transferred and provides Y address increment counter 424 and C address increment counter 425 with this information so that the corresponding DMA address can be updated accordingly. Counter 423 inquires bus 100 about the transfer byte count using bus_req signal. In response, bus 100 provides counter 423 with the transfer byte count. In the preferred embodiment, each transfer byte count is eight (8) bytes. Signal sel_chroma indicates to counter 423 whether the byte count corresponds to a luminance component data transfer or chrominance component data transfer in order to update the correct address.

If a luminance component data transfer is involved as indicated by a low sel_chroma signal, counter 423 provides an inc_y signal to Y address increment counter 424 which adds the transfer byte count to the current Y address value to determine the update Y address value. The update Y address value is then sends to multiplexer 427 which passes it through to host/DMA interface 201. If a chrominance component data transfer is involved as indicated by a high sel_chroma signal, counter 423 provides an inc_c signal to C address increment counter 425 which adds the transfer byte count to the current C address value to determine the update C address value. The update C address value is then sends to multiplexer 427 which passes it through to the memory in MSP 202. Separate addresses for chrominance and luminance component data are required because upon their retrieval they are stored in separate locations of the MSP internal memory as discussed earlier.

To illustrate sequential logical states of color space components splitting circuit 400, refer now to FIGS. 5A–5L illustrating, as an example, timing diagrams for color space components splitting circuit 400. As discussed earlier, color space components splitting circuit 400 is synchronous to clock signal CLK which is illustrated in FIG. 5B. FIG. 5A illustrates the DIN(63:00) data signal provided as input to circuit 400. Considering FIG. 5A together with FIG. 5B, successive DIN(63:00) data signals having interleaved luminance and chrominance component data are provided to the input of circuit 400 at successive clock cycles.

FIGS. 5C–5F illustrate select signals LD_31_0, LD_63_32, LDD_63_32, and sel_chroma respectively. As discussed earlier, these select signals are used to timely select the desired data signal for processing. Thus, the timing of these select signals are crucial to the operation of color space components splitting circuit 400. Being consistent with earlier discussion, the pulse widths of all four select signals are substantially equal to one clock signal CLK cycle. Moreover, select signals LD_31_0, LDD_63_32, and sel_chroma all have a delay of approximately one clock cycle relative to select signal LD_63_32. For this reason, select signals LD_31_0, LDD_63_32, and sel_chroma are substantially identical to each other.

FIG. 5G illustrates the content of signal YOUT_D(31:00) (i.e., Y1–Y9) at successive clock cycles. Signal YOUT_D (31:00) is the combined output of flip-flops 401, 403, 405, and 407. As illustrated in FIG. 5G, signal YOUT_D(31:00) only contains the luminance color space component data. Similar to a D flip-flop, its output at time (t+1) is equal to its input at time t. As such, there is one clock cycle delay between signal YOUT_D(31:00) which is provided as the output of registers 401, 403, 405 and 407 and the luminance component bytes of signal DIN(63:00) that are provided at the input of the same registers. For example, luminance component bytes Y1 that are provided to the input of registers 401, 403, 405, and 407 at time t1 do not show up as signal YOUT_D(63:00) until time t2.

Likewise, FIG. 5H illustrates the content of signal COUT_D(31:00) (i.e., C1–C9) at successive clock cycles.

Signal COUT_D(31:00) is the combined output of flip-flops 402, 404, 406, and 408. As illustrated in FIG. 5H, signal COUT_D(31:00) only contains the chrominance color space component data. For a register, its output at time (t+1) is equal to its input at time t. As such, there is one clock cycle delay between signal COUT_D(31:00) which is provided as the output of registers 402, 404, 406, and 408 and the chrominance component bytes of signal DIN(63:00) that are provided at the input of the same registers. For example, luminance component bytes C1 that are provided to the input of registers 402, 404, 406, and 408 at time t1 do not show up as signal COUT_D(63:00) until time t2.

As discussed earlier, a wait state of one clock cycle needs to be inserted into signal COUT_D(31:0) to compensate for the order chrominance color space component data is output relative the luminance color space component data. FIG. 5I illustrates signal COUT_DU(31:00) which is a delayed signal COUT_D(31:00).

Referring now to FIG. 5J illustrating signal YOUT_DD(63:00) which is a combination of two successive YOUT_D(31:00) signals. Luminance color space component Y1 is provided as an input to multiplexers 409–410 at time t2. The other input to multiplexer 409 is the current output signal of register 411 which is null at time t2. Likewise, the other input to multiplexer 410 is the current output signal of register 412 which is also null at time t2. Select signal LD_31_0 is high a time t2, hence multiplexer 410 allows luminance color space component Y1 to pass through to its output. Select signal LD_63_32 is also high at time t2, hence multiplexer 409 also allows luminance color space component Y1 to pass through to its output. As such, at the next clock signal t3, the two outputs of multiplexers 409–410 are provided as the outputs of registers 411–412 respectively. The outputs of registers 411–412 are combined into signal YOUT_DD(63:00) and has a content of Y1+Y1 at time t3 as shown in FIG. 5J.

At time t3, luminance color space component Y2 is provided as an input to multiplexers 409–410. The other input to multiplexer 409 is the current output of register 411 which is Y1 at time t3. Likewise, the other input to multiplexer 410 is the current output of register 412 which is Y1 at time t3. Select signal LD_31_0 is high a time t3, hence multiplexer 410 allows luminance color space component Y2 to pass through to its output. Conversely, select signal LD_63_32 is low at time t3, hence multiplexer 409 allows the current output of register 411 which is Y1 to pass through to its output. As such, at the next clock signal t4, the two outputs of multiplexers 409–410 are provided as the outputs of registers 411–412 respectively. The outputs of registers 411–412 are combined into signal YOUT_DD(63:00) and has a content of Y2+Y1 at time t4 as shown in FIG. 5J. Following the same logic, signal YOUT_DD(63:00) at successive clock cycles can be determined.

Referring now to FIG. 5K illustrating signal COUT_DD(63:00) which is a combination of two successive COUT_D(31:00) signals. Chrominance color space component C1 is provided as an input to multiplexer 417 at time t2. On the other hand, delayed signal COUT_DU(31:0) having a null value is provided as an input to multiplexer 416 at time t2. The other input to multiplexer 416 is the current output signal of register 418 which is null at time t2. Likewise, the other input to multiplexer 410 is the current output signal of register 412 which is also null at time t2. Select signal LD_31_0 is high a time t2, hence multiplexer 417 allows chrominance color space component C1 to pass through to its output. Delayed elect signal LDD_63_32 is also high at time t2, hence multiplexer 416 also allows a null value pass through to its output. As such, at the next clock signal t3, the two outputs of multiplexers 416–417 are provided as the outputs of registers 418–419 respectively. The outputs of registers 418–419 are combined into signal COUT_DD(63:00) and has a content of C1+0 at time t3 as shown in FIG. 5K.

At time t3, chrominance color space component C2 is provided as an input to multiplexer 417 at time t3. On the other hand, chrominance color space component C1 from delayed signal COUT_DU(31:0) is provided as an input to multiplexer 416 at time t3. The other input to multiplexer 416 is the current output of register 418 which is null at time t3. Likewise, the other input to multiplexer 417 is the current output of register 419 which is C1 at time t3. Select signal LD_31_0 is high a time t3, hence multiplexer 417 allows chrominance color space component C2 to pass through to its output. Delayed select signal LDD_63_32 is also high at time t3, hence multiplexer 416 allows chrominance color space component C1 from delayed signal COUT_DU(31:0) to pass through to its output. As such, at the next clock signal t4, the two outputs of multiplexers 416–417 are provided as the outputs of registers 418–419 respectively. The outputs of registers 418–419 are combined into signal COUT_DD(63:00) and has a content of C2+C1 at time t4 as shown in FIG. 5K. Following the same logic, signal COUT_DD(63:00) at successive clock cycles can be determined.

Signals YOUT_DD(63:00) and COUT_DD(63:00) are provide as inputs to multiplexer 413. Select signal sel_chroma controls the output of multiplexer 413. When select signal sel_chroma is high, signal COUT_DD(63:00) is passed through as the output. Conversely, when select signal sel_chroma is low, signal YOUT_DD(63:00) is passed through as the output. Referring now to FIG. 5L illustrating output signal DOUT(63:00) of multiplexer 413. At time t3, select signal sel_chroma is high. Hence, signal COUT_DD(63:00) having a value of C1+0 at time t3 is passed through as output signal DOUT(63:00). At time t4, select signal sel_chroma is low. Hence, signal YOUT_DD(63:00) having a value of Y2+Y1 at time t4 is passed through as output signal DOUT(63:00). At time t5, select signal sel_chroma is high. Hence, signal COUT_DD(63:00) having a value of C2+C1 at time t5 is passed through as output signal DOUT(63:00). Following the same logic, signal DOUT(63:00) at successive clock cycles can be determined.

Figure 6:
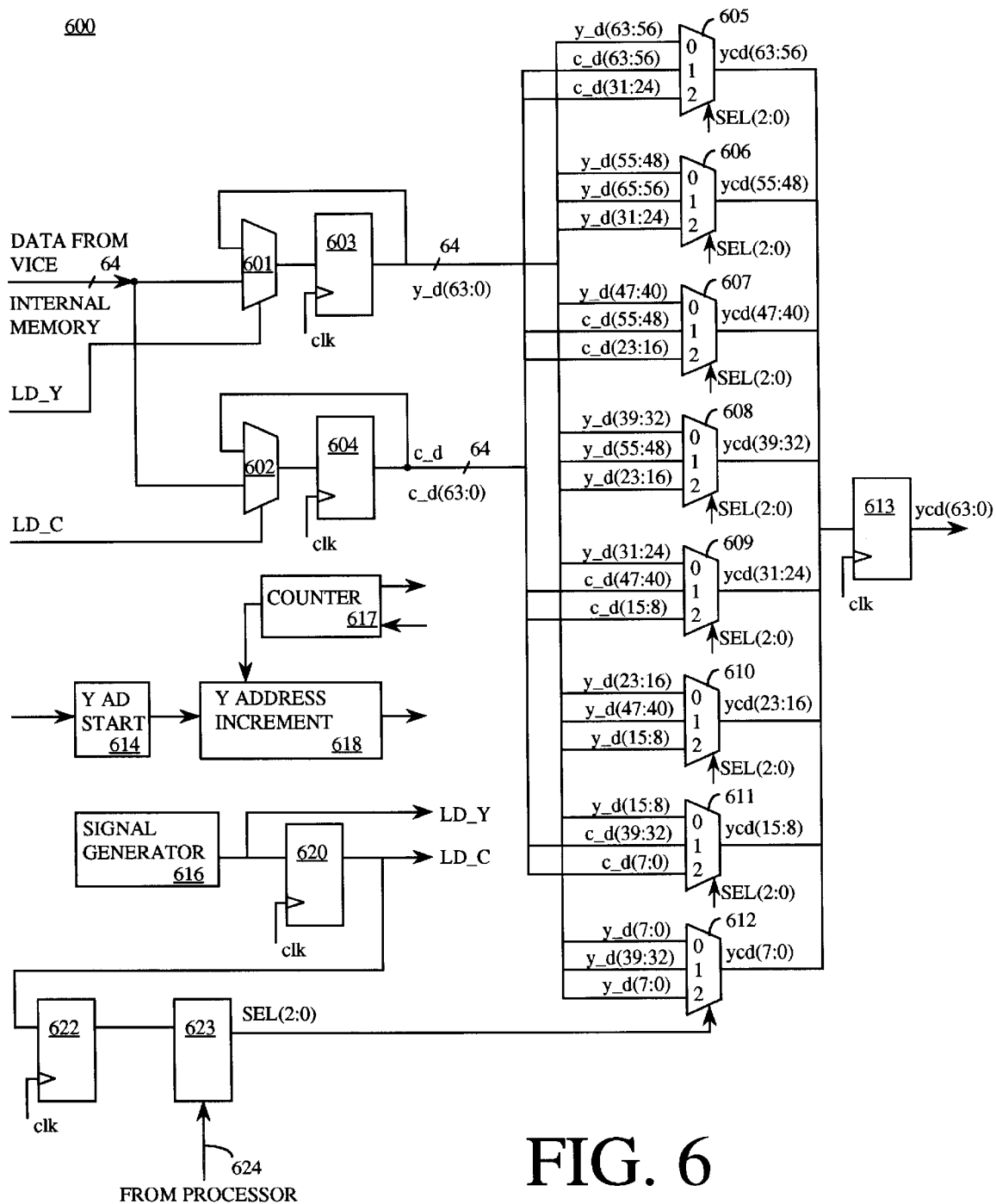
FIG. 6 is a block diagram illustrating an embodiment of the circuit to combine color space components stored separately into an interleaved data stream in accordance with the present invention.

After video/image processor 102 performs graphics/image processing, compression, or expansion on separated luminance color space component data and chrominance color space component data, these data can be transferred back to main memory 104. Prior to doing so, the separated luminance color space component data and chrominance color space component data are combined back into the interleaved format. Reference is now made to FIG. 6 illustrating a circuit to combine color space components into an interleaved format in accordance with another aspect of the preferred embodiment of the present invention. The circuit in FIG. 6 is designed for luminance-chrominance color space. However, it is clear to a person of ordinary skill in the art that with minor modifications the circuit in FIG. 6 is applicable to other color spaces such as the RGB color space.

In FIG. 6, sixty-four bytes of data from the internal memory inside MSP 202 is sent to circuit 600 for each clock cycle. Separate luminance and chrominance color space component data represented by signal DI(63:00) is sent to circuit 600 at alternate clock cycles. Signal DI(63:00) is input into both multiplexers 601 and 602. The other inputs to multiplexers 601 and 602 are output signals Y_D(63:0)

and C_D(63:00) of registers 603 and 604, respectively. Registers 603 and 604 function like D-type flip-flops to hold the output signals constant for a clock cycle. While multiplexer 601 is controlled by select signal LD_Y, multiplexer 602 is controlled by select signal LD_C. In the preferred embodiment, when select signal LD_Y is high, multiplexer 601 allows signal DI(63:00) to pass through as its output to register 603. Otherwise, when select signal LD_Y is low, multiplexer 601 allows feedback signal Y_D(63:00) from register 603 to pass through as its output. The feedback signal provides a repeat of the prior output which may be necessary for combining two separate data streams into an interleaved one.

Similarly, when select signal LD_C is high, multiplexer 602 allows signal DI(63:00) to pass through as its output to register 604. Otherwise, when select signal LD_C is low, multiplexer 602 allows feedback signal C_D(63:00) from register 604 to pass through as its output. The feedback signal provides a repeat of the prior output which may be necessary for combining two separate data streams into an interleaved one.

The outputs of multiplexers 601 and 602 are provided as inputs to registers 603 and 604, respectively. Clock signal CLK is also provided as an input to registers 603 and 604. Registers 603 and 604 provide as their outputs signals Y_D(63:00) and C_D(63:00), respectively. Registers 603 and 604 ensure that signals Y_D(63:00) and C_D(63:00) are latched (i.e., remain constant) for one clock cycle in order to direct the individual bytes of signals Y_D(63:00) and C_D(63:00) to the desired one of multiplexers 605–612 for combining the two separate data streams into one interleaved data stream.

In directing individual bytes of signals Y_D(63:00) and C_D(63:00) to the desired multiplexer, care is taken to make sure that the bytes of the interleaved data stream created correspond to the bytes of the interleaved data signal DIN(63:00) of FIG. 4. Keeping this guideline in mind, multiplexer 612 receives signals Y_D(7:0), Y_D(39:32), and Y_D(7:0) at its inputs 2, 1, and 0, respectively. Multiplexer 611 receives signals C_D(7:0), C_D(39:32), and Y_D(15:8) at its inputs 2, 1, and 0, respectively. Multiplexer 610 receives signals Y_D(15:8), Y_D(47:40), and Y_D(23:16) at its inputs 2, 1, 0, respectively. Multiplexer 609 receives signals C_D(15:8), C_D(47:40), and Y_D(31:24) at its inputs 2, 1, 0, respectively. Multiplexer 608 receives signals Y_D(23:16), Y_D(55:48), and Y_D(38:32) at its inputs 2, 1, 0, respectively. Multiplexer 607 receives signals C_D(23:16), C_D(55:48), and Y_D(47:40) at its inputs 2, 1, 0, respectively. Multiplexer 606 receives signals Y_D(31:24), Y_D(63:56)), and Y_D(55:48) at its inputs 2, 1, 0, respectively. Finally, multiplexer 605 receives signals C_D(31:24), C_D(63:56), and Y_D(63:56) at its inputs 2, 1, 0, respectively. In so doing, multiplexers 605–612 will output the desired sequence of interleaved luminance and chrominance component data given the control scheme of select signal SEL(2:0).

Multiplexers 605–612 all receives signal SEL(2:0) as their control signal. In the preferred embodiment, when signal SEL(2:0) has a value of 2, multiplexers 605–612 allows its input 2 to pass through as its output. When signal SEL(2:0) has a value of 1, multiplexers 605–612 allows its input 1 to pass through as its output. When signal SEL(2:0) has a value of 0, multiplexers 605–612 allows its input 0 to pass through as its output. As such, when signal SEL(2:0) has a value of 2, the combined outputs of multiplexers 612–605 are Y_D(7:0), C_D(7:0), Y_D(15:8), C_D(15:8), Y_D(23:16), C_D(23:16), Y_D(31:24), and C_D(31:24), respectively. When signal SEL(2:0) has a value of 1, the combined outputs of multiplexers 612–605 are Y_D(39:32), C_D(39:32), Y_D(47:40), C_D(47:40), Y_D(55:48), C_D(55:48), Y_D(63:56), and C_D(63:56), respectively. When signal SEL(2:0) has a value of 0, the combined outputs of multiplexers 612–605 are Y_D(7:0), Y_D(15:8), Y_D(23:16), Y_D(31:24), Y_D(39:32), Y_D(47:40), Y_D(55:48), and Y_D(63:56), respectively. When signal SEL(2:0) has a value of 0, the whole block of luminance color space component data is passed through. This case occurs when the pass through mode is selected instead of the interleaved components mode is selected by central processor 101. It should be clear to a person of ordinary skill in the art that different combinations of inputs to multiplexers 605–612 and different select signal SEL(2:0) schemes will also produce the same combinations of output discussed above.

The outputs of multiplexers 605–612 are provided as inputs to register 613. Clock signal CLK is also provided as an input to register 613. Register 613 provides as its output signal YCD(63:00) and sends it to main memory 104.

As discussed above, the three control signals LD_Y, LD_C, and SEL(2:0) play important roles in combining separate luminance and chrominance component data into an interleaved stream. To generate control signals LD_Y and LD_C, central processor 101 provides a signal indicating the start of a DMA transfer to signal generator 616. Signal generator 616 provides as its output a series of pulses. This series of pulses is select signal LD_Y. Preferably, each pulse width is equal to one clock signal CLK cycle. Moreover, select signal LD_Y has a pulse gap of approximately three clock cycles. Select signal LD_Y is provided as an input into D flip-flop 620 which has a delay of approximately one clock signal CLK cycle. D flip-flop 620 provides as its output select signal LD_C. In general, D flip-flop 620 introduces a wait state into select signal LD_C to compensate for the interleaved order of luminance and chrominance component data.

To generate control signal SEL(2:0), select signal LD_C is provided as an input into D flip-flop 622 which has a delay of approximately one clock signal CLK cycle. In general, D flip-flop 622 introduces a wait state to compensate for the extra delay relative to signal LD_C. The output of D flip-flop 622 is provided as a select signal to decoder 623. Central processor 101 provides signal 624 as an information input to decoder 623. Depending on the mode provided by signal 624, decoder 623 outputs the desired binary signal SEL(2:0) to multiplexers 605–612.

For a DMA transfer, the starting memory address of the destination memory must be provided along with the data. As such, a corresponding memory address must accompany signal YCD(63:00) every time. To generate the corresponding memory address for each YCD(63:00) signal which carries sixty-four (64) bits of interleaved luminance or chrominance component data, at the start of the DMA transfer, central processor 101 first load the starting address of the destination memory into register 614. The starting address stored in register 614 then provided to address increment counter 618 to use in updating the address required in DMA transfer.

Counter 617 monitors the number of bytes transferred and provides address increment counter 618 with this information so that the corresponding DMA address can be updated accordingly. Counter 617 inquires bus 100 about the transfer byte count using bus_req signal. In response, bus 100 provides counter 617 with the transfer byte count. In the preferred embodiment, each transfer byte count is eight (8) bytes. Upon receiving each new bus count signal, counter 617 provides an inc signal to address increment counter 618 which adds the transfer byte count to the current address value to determine the update address value. The update address value is then sends to main memory 104.

Figure 7A:
FIGS. 7A–7H are timing diagrams of certain inputs, outputs, and nodes of the interleaving circuit of FIG. 6.
Figure 7B:

To illustrate sequential logical states of color space components interleaving circuit 600, refer now to FIGS. 7A–5H illustrating, as an example, timing diagrams for color space components interleaving circuit 600. As discussed earlier, color space components splitting circuit 400 is synchronous to clock signal CLK which is illustrated in FIG. 7B. FIG. 7A illustrates data signal DI(63:00) provided as input to circuit 600. Considering FIG. 7A together with FIG. 7B, successive DI(63:00) data signals of separate luminance and chrominance component data are provided to the input of circuit 600 at successive clock cycles 1 and 2, 5 and 6, and 9 and 10. No data is presented to circuit 600 at successive clock cycles 3–4 and 7–8 because circuit 600 needs time to process the input data provided at the previous two clock cycles.

Figure 7C:
Figure 7D:
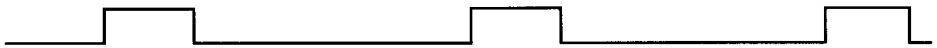
Figure 7E:

FIGS. 7C–7E illustrate select signals LD__Y, LD__63__32, LDD__C, and SEL(2:0) respectively. As discussed earlier, these select signals are used to timely select the desired data signal for processing. Thus, the timing of these select signals are crucial to the operation of color space components interleaving circuit 600. Being consistent with earlier discussion, the pulse widths of select signals LD__Y and LD__C are substantially equal to one clock signal CLK cycle. The pulse gap for select signals LD__Y and LD__C is approximately three clock cycles. Moreover, select signal LD__C has a delay of approximately one clock cycle relative to select signal LD__Y. Select signal SEL(2:0) is illustrated in terms of its binary value at each clock cycle. As illustrated, select signal SEL(2:0) has a delay of approximately two clock cycles relative to select signal LD__Y.

Figure 7F:
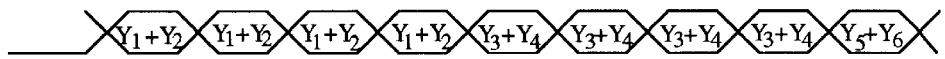

FIG. 7F illustrates the content of signal Y__D(63:00) at successive clock cycles. Signal Y__D(63:00) is the output of register 603. Similar to a D flip-flop, its output at time (t+1) is equal to its input at time t. As such, there is one clock cycle delay between signal Y__D(63:00) which is provided as the output of register 603 and data signal DI(63:00) that are provided at the input of register 603.

At time t1, luminance component bytes Y1+Y2 is provided as an input to multiplexer 601. The other input to multiplexer 601 is the current output of register 603 which is null at time t1. Select signal LD__Y is high a time t1, hence multiplexer 601 allows luminance component bytes Y1+Y2 to pass through to its output. At the next clock cycle, time t2, register 603 latches its input Y1+Y2 and provide this as its output. At time t2–t4, select signal LD__Y is low. Hence multiplexer 601 allows the current output of register 603 which is Y1+Y2 to pass through to its output. As such, at time t3–t5, signal Y__D(63:00), the outputs of register 603, also has a value of Y1+Y2. Following the same logic, signal Y__D(63:00) at successive clock cycles can be determined.

Figure 7G:

Likewise, FIG. 7G illustrates the content of signal C__D (63:00) at successive clock cycles. Signal C__D(63:00) is the output of flip-flop 604. Similar to a D flip-flop, its output at time (t+1) is equal to its input at time t. As such, there is one clock cycle delay between signal C__D(63:00) which is provided as the output of register 604 and data signal DI(63:00) that are provided at the input of register 604.

At time t2, chrominance component bytes C1+C2 is provided as an input to multiplexer 602. The other input to multiplexer 602 is the current output of register 604 which is null at time t2. Select signal LD__C is high a time t2, hence multiplexer 602 allows chrominance component bytes C1+C2 to pass through to its output. At the next clock cycle, time t3, egister 604 latches its input C1+C2 and provide this as its output. At time t3–t5, select signal LD__C is low. Hence multiplexer 602 allows the current output of register 604 which is C1+C2 to pass through to its output. As such, at time t4–t6, signal C__D(63:00), the outputs of register 604, also has a value of C1+C2. Following the same logic, signal C__D(63:00) at successive clock cycles can be determined.

Figure 7H:

Reference is now made to FIG. 7H illustrating the timing diagram for signal YCD(63:00). Beginning at time t3, both luminance and chrominance component data are presented to multiplexers 605–612. Select signal SEL(2:0) has a binary value of 2 at time t3, hence the data present at input 2 of multiplexers 605–612 are allowed through to register 613. Referring back to FIG. 6, it is clear that the output of multiplexers 605–612 have interleaved luminance and chrominance component bytes of Y1C1 at time t3. Hence, at the next clock cycle, time t4, register 613 latches its input Y1C1 and provide this as its output. At time t4, select signal SEL(2:.0) has a binary value of 1. Hence the data present at input 1 of multiplexers 605–612 are allowed through to register 613. Referring back to FIG. 6, it is clear that the output of multiplexers 605–612 have interleaved luminance and chrominance component bytes of Y2C2 at time t4. Hence, at the next clock cycle, time t5, register 613 latches its input Y2C2 and provide this as its output. Following the same logic, signal YCD(63:00) at successive clock cycles can be determined.

The preferred embodiment of the present invention, an apparatus to reformat color space components data, is thus described. While the present invention has been described in particular embodiments, it should be appreciated that the present invention should not be construed as limited by such embodiments, but rather construed according to the below claims.

What is claimed is:

1. An arrangement synchronized to a clock signal for separating M interleaved data types in one data stream, the arrangement comprising:

a routing circuit receiving as input N data bits of the data stream per clock cycle, the N data bits input including all M data types, the routing circuit directing data bits of each data type to a predetermined one of M routing data signals;

M combining circuits, each combining circuit coupled to one of the M routing data signals, each of the M combining circuits adjoining in a predetermined order data bits received over M successive clock cycles to form a combined data signal having N data bits, the M combining circuits output the M combined data signals; and a selecting circuit coupled to the M combined data signals, the selecting circuit outputting the M combined data signals received in a predetermined order.

2. The arrangement in claim 1 wherein the routing circuit comprising a plurality of registers synchronized to the clock signal, each of the plurality of registers receiving as input predetermined ones of the N data bits at each clock signal, each of the plurality of registers outputting the predetermined ones of the N data bits at the following clock signal, wherein all the data bits of each data type being directed to a different one of the M routing data signals.

3. The arrangement of claim 1, wherein each of the M combining circuits comprising M latching circuits, each of the M latching circuits having an input, each of the M latching circuits having a separate output, the inputs of the M latching circuits receiving signals from the predetermined one of M routing data signals, the outputs of the M latching circuits being joined together into a combined data signal having N data bits.

4. The arrangement of claim 3, wherein each of the M latching circuits of the M combining circuits comprising:

a register synchronized to the clock signal, the register having an input and an output serving as the output of the combining circuit; and a multiplexer having a first input, a second input, and an output, the first input receiving signals from the output of the register, the second inputs of the M latching circuits receiving signals from the predetermined one of M routing data signals, the multiplexer providing as output a signal having data bits from either the first or the second input depending on a control signal;

wherein signals from the outputs of the registers being combined to form the combined data signal having N data bits.

5. The arrangement of claim 4, wherein each of the control signals of the M latching circuits having an activating period of one clock cycle and a deactivating period of (M−1) clock cycles, wherein the control signal of the second of the M latching circuits being delayed by one clock signal relative to the control signal of the first of the M latching circuits, the control signal of the third of the M latching circuits being delayed by one clock signal relative to the control signal of the second of the M latching circuits, and so on such that the control signal of the Mth of the M latching circuits being delayed by one clock signal relative to the control signal of the (M−1)th of the M latching circuits.

6. The arrangement of claim 5, wherein selected M latching circuits further comprising:

a first delay circuit to insert a plurality of wait states into signals received at the second inputs of the selected M latching circuits; and a second delay circuit to insert the plurality of wait states into the control signals of the selected M latching circuits.

7. The arrangement of claim 5, wherein the selecting circuit comprising a multiplexer.

8. The arrangement of claim 7, wherein the multiplexer being controlled by the control signal of the Mth latching circuit.

9. An arrangement synchronized to a clock signal for interleaving data bits of X different data types into a stream of data bits, the arrangement comprising:

X latching circuits, each receiving as input Y data bits of a predetermined data type at every X clock cycles, each of the X latching circuits outputting the Y data bits received at every X clock cycles for a predetermined number of successive clock cycles;

a routing circuit receiving as input the outputs from the X latching circuits, the routing circuit directing a signal having X*Z selected data bits of a data type to a predetermined one of Y/Z routing data signals; and Y/Z selecting circuits each receiving a predetermined one of the Y/Z routing data signals, each of the Y/Z selecting circuits selectively outputting Z data bits of a data type at a time such that the Y/Z selecting circuits providing a combined output signal having Y data bits of X data types, the X data types of the combined output signal being interleaved in a predetermined order.

10. The arrangement of claim 8 further comprising a latch, the latch receiving as input Y data bits of X data types of the combined output signal at each clock cycle, the latch outputting the N data bits of M data types of the combined output signal at the next clock cycle.

11. The arrangement of claim 8 wherein each of the X latching circuits comprising:

a register synchronized to the clock signal, the register having an input and an output; and a multiplexer having a first input, a second input, and an output, the first input receiving signals from the output of the register, the second input receiving signals having Y data bits of the predetermined data type at every X clock cycles, the multiplexer providing as output a signal having Y data bits from either the first or the second input in response to a control signal to the input of the D type flip-flop;

the D type flip-flop providing at the output Y data bits of the predetermined data type received at every X clock cycles for (X+1) successive clock cycles.

12. The arrangement of claim 10, wherein each of the control signals of the X latching circuits having an activating period of one clock cycle and a deactivating period of (X+1) clock cycles, wherein the control signal of the second of the X latching circuits being delayed by one clock signal relative to the control signal of the first of the X latching circuits, the control signal of the third of the X latching circuits being delayed by one clock signal relative to the control signal of the second of the X latching circuits, and so on such that the control signal of the Xth of the X latching circuits being delayed by one clock signal relative to the control signal of the (X−1)th of the X latching circuits.

13. The arrangement of claim 8 wherein the routing circuit directing a signal having X*Z selected data bits of a data type to a predetermined one of Y/Z routing data signals according to the following pattern: the routing circuit providing data bits zero-to-Z of each data type to a first X successive routing signals respectively, the routing circuit providing data bits (Z+1)-to-(2Z+1) of each data type to a next X successive routing signals respectively, and so on until all the data bits of all data types are directed to the Y/Z routing signals wherein when the Y/Z routing signals limit is reached, the routing circuit providing the next sequence of data bits to the first X successive routing signals.

14. The arrangement of claim 12, wherein each of Y/Z selecting circuits comprising a multiplexer, the multiplexer having at least X inputs and an output, each input receiving (Z+1) data bits of a data type such that input 1 receiving the LSB (Z+1) data bits, input 2 receiving the next higher data bits and so on, the multiplexer providing at the output the data bits received at one of X inputs in response to the control signal.

15. The arrangement of claim 13, wherein the control signal indicating to the multiplexer to sequentially passing through as output the X inputs in an ascending order.

16. An arrangement synchronized to a clock signal, the arrangement receiving at a first input a data stream having M interleaved data types, the arrangement receiving at a second input X separate data streams of different data types, the arrangement separating the data stream having M interleaved data bytes received at the first input into M separate data streams of different data types, the arrangement interleaving the X different data streams of different data types into a data stream of X interleaved data types, the arrangement comprising:

a routing circuit receiving as input N data bits of the data stream having M interleaved data bytes per clock cycle, the N data bits input including all M data types, the routing circuit directing data bits of each data type to a predetermined one of M routing data signals;

M combining circuits, each combining circuit coupled to one of the M routing data signals, each of the M combining circuits adjoining in a predetermined order data bits received over M clock cycles to produce a combined data signal having N data bits, the M combining circuits output the M combined data signals;

a selecting circuit coupled to the M combined data signals, the selecting circuit outputting the M combined data signals received in a predetermined order;

X latching circuits, each receiving as input Y data bits of a data type at every X clock cycles, each of the X latching circuits outputting the Y data bits received at every X clock cycles for a predetermined number of successive clock cycles;

a routing circuit receiving as input the outputs from the X latching circuits, the routing circuit directing a signal having X*Z selected data bits of a data type to a predetermined one of Y/Z routing data signals; and Y/Z selecting circuits each receiving a predetermined one of the Y/Z routing data signals, each of the Y/Z selecting circuits selectively outputting Z data bits of a data type at a time such that the Y/Z selecting circuits providing a combined output signal having Y data bits of X data types, the X data types of the combined output signal being interleaved in a predetermined order.

17. A computer system comprising:

a bus;

a CPU coupled to the bus;

a memory controller coupled to the bus;

a main memory coupled to the memory controller; and a graphics controller coupled to the bus, the graphics controller comprising:
an internal bus;
a processor coupled to the internal bus; and
a data transfer circuit coupled to the internal bus, the data transfer circuit comprising an arrangement synchronized to a clock signal, the arrangement receiving at a first input a data stream having M interleaved data types, the arrangement receiving at a second input X separate data streams of different data types, the arrangement separating the data stream having M interleaved data bytes received at the first input into M separate data streams of different data types, the arrangement interleaving the X different data streams of different data types into a data stream of X interleaved data types, the arrangement comprising:

a routing circuit receiving as input N data bits of the data stream having M interleaved data bytes per clock cycle, the N data bits input including all M data types, the routing circuit directing data bits of each data type to a predetermined one of M routing data signals;

M combining circuits, each combining circuit coupled to one of the M routing data signals, each of the M combining circuits adjoining in a predetermined order data bits received over M clock cycles to produce a combined data signal having N data bits, the M combining circuits output the M combined data signals;

a selecting circuit coupled to the M combined data signals, the selecting circuit outputting the M combined data signals received in a predetermined order;

X latching circuits, each receiving as input Y data bits of one of the X data streams of different data types per each clock cycle, each of the X latching circuits outputting the Y data bits received at each clock cycle for a predetermined number of successive clock cycles;

a routing circuit receiving as input the outputs from the X latching circuits, the routing circuit directing a signal having X*Z selected data bits of a data type to a predetermined one of Y/Z routing data signals; and Y/Z selecting circuits each receiving a predetermined one of the Y/Z routing data signals, each of the Y/Z selecting circuits selectively outputting Z data bits of a data type at a time such that the Y/Z selecting circuits providing a combined output signal having Y data bits of X data types, the X data types of the combined output signal being interleaved in a predetermined order.

* * * * *